United States Patent
May et al.

(10) Patent No.: US 10,923,440 B2
(45) Date of Patent: Feb. 16, 2021

(54) METHOD OF SECURING AN INTEGRATED CIRCUIT DURING MANUFACTURING

(71) Applicant: COMMISSARIAT A L'ENERGIE ATOMIQUE ET AUX ENERGIES ALTERNATIVES, Paris (FR)

(72) Inventors: Michael May, Saint Jean de Moirans (FR); Florian Pebay-Peyroula, Saint-Nizier-du-Moucherotte (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/973,974

(22) Filed: May 8, 2018

(65) Prior Publication Data

US 2018/0358310 A1    Dec. 13, 2018

(30) Foreign Application Priority Data

May 10, 2017 (FR) ..................... 17 54078

(51) Int. Cl.
| | | |
|---|---|---|
| H01L 23/00 | (2006.01) | |
| H04L 9/32 | (2006.01) | |
| G06F 21/73 | (2013.01) | |
| H01L 21/768 | (2006.01) | |

(52) U.S. Cl.
CPC ........... *H01L 23/573* (2013.01); *G06F 21/73* (2013.01); *H01L 21/76892* (2013.01); *H01L 23/57* (2013.01); *H01L 23/576* (2013.01); *H04L 9/3278* (2013.01)

(58) Field of Classification Search
CPC ............ H01L 23/573; H01L 21/76892; H01L 9/3278; H01L 21/02683; H01L 21/68785; H01L 27/1285; H01L 23/57; G06F 21/73; H04L 9/3278
See application file for complete search history.

(56) References Cited

U.S. PATENT DOCUMENTS

| | | | |
|---|---|---|---|
| 9,991,892 B2* | 6/2018 | Wacquez | H01L 23/544 |
| 2013/0233608 A1* | 9/2013 | Feng | H04L 9/3278 |
| | | | 174/264 |
| 2014/0042627 A1* | 2/2014 | Edelstein | H01L 23/5226 |
| | | | 257/758 |
| 2014/0203448 A1* | 7/2014 | Song | H01L 23/5384 |
| | | | 257/774 |

OTHER PUBLICATIONS

French Preliminary Search Report dated Feb. 23, 2018 in French Application 17 54078 filed on May 10, 2017 (with English Translation of Categories of Cited Documents).

(Continued)

*Primary Examiner* — Farun Lu
(74) *Attorney, Agent, or Firm* — Oblon, McClelland, Maier & Neustadt, L.L.P.

(57) ABSTRACT

An integrated circuit and a method of securing the integrated circuit during its fabrication. The method includes delimitation of the integrated circuit into a first zone called a standard zone and a second zone called a security zone, and random degradation of an interconnection structure of the security zone thus forming a physical unclonable function modelled by random electrical continuity that can be queried by a challenge-response authentication protocol.

14 Claims, 3 Drawing Sheets

(56) References Cited

OTHER PUBLICATIONS

U.S. Appl. No. 14/642,081, filed Mar. 9. 2015, US 2016-0359620 A1, Florian Pebay-Peyroula.
U.S. Appl. No. 15/412,252, filed Jan. 23, 2017, US 2017-0214523 A1, Florian Pebay-Peyroula, et al.
Written Opinion dated Feb. 23, 2018 in French Patent Application No. 1754078.
Blaise Gassend, et al., "Silicon Physical Random Functions", Computer Science and Artificial Intelligence Laboratory, Nov. 2002, 14 pages.
Sandeep S. Kumar, et al., "Extended Abstract: The Butterfly PUF Protecting IP on every FPGA", Hardware-Oriented Security and Trust, 2008, 4 pages.
Ryan Helinski, et al., "A Physical Unclonable Function Defined Using Power Distribution System Equivalent Resistance Variations", Design Automation Conference, 2009, 6 pages.

\* cited by examiner

METHOD OF SECURING AN INTEGRATED CIRCUIT DURING MANUFACTURING

TECHNICAL DOMAIN

This invention relates to the domain of securing integrated circuits, particular using physical unclonable functions.

STATE OF PRIOR ART

Counterfeiting of integrated circuits is now a major problem for manufacturers and users. Attempts are being made to resist this counterfeiting by finding means of discriminating between a legitimate circuit and a counterfeit circuit.

A first solution would consist of attributing a single identifier for each integrated circuit and constructing a database of legitimate identifiers. This solution is not very viable because it is fairly simple to emulate (or replay) a valid identifier using a hardware or software lock.

A more efficient solution consists of using a challenge-response mechanism to make an authentication while protecting against attack by emulation (replay). This technique is based on the use of a function to calculate the response from the challenge. The function must be unique for each integrated circuit and must be unclonable. It must be physically impossible for an attacker to physically recreate or to clone such a function. This type of function is called a PUF (Physical Unclonable Function).

Prior art includes integrated circuits containing different sorts of PUFs making use of functional dispersions inherent to the circuits.

A first PUF technique makes use of the variability induced on signal propagation times at the limits of electronic constraints of the circuit. A first example is an integrated circuit comprising an arbitrator PUF consisting of inserting electrical signals at the input to a long path of combination circuits and detecting the fastest signal. A path is set up in the circuit between the different signals that propagate along different combination paths and the signal that arrives first is detected by the arbitrator. The electrical input signals define the challenge and the first detected signal defines the response.

Another example is the ring oscillator PUF described in the document by Gassend et al. entitled "Silicon Random Functions"; *proceedings of the Computer and Communications Security Conference*, November 2002. This PUF is composed of several delay loops oscillating at specific frequencies and that control counters. The loops are arranged identically but inherent technological dispersions lead to loops with slightly different frequencies. Thus, counters controlled by loops are used to produce response bits to a challenge.

A second PUF technique makes use of instabilities on startup. For example, SRAM memories, already present in most circuits, can be used as PUFs. The basic principle is to recover the state of the memory during startup, that is normally unique. On the same principle, the PUF can be implemented by butterfly circuits made from matrices of two cross locks in which the state of the memory dot during start up is undetermined. This technique is described in the document by Kumar et al. entitled "The Butterfly PUF: Protecting IP on every FPGA"; *Workshop on Cryptographic Hardware and Embedded Systems (CHES), September 2007, Vienna*. Similarly, there are also bistable ring circuits composed of an odd number of inverters and thus also having an undetermined state on start up.

A third PUF technique makes use of technological dispersions of resistances in a circuit. Such a technique is described in the document by R Helinski et al. entitled "A Physical Unclonable Function Defined Using Power Distribution System Equivalent Resistance Variations"; *DAC 2009*. More particularly, the authors propose to measure the voltage drop in an integrated circuit between the power supply planes and ground planes due to technological dispersions of resistances defined by conducting tracks and interconnections of the circuit. The voltage drop is proportional to the current measured in short circuited inverters arranged over the entire surface of the circuit.

However, all PUFs described above are based on operations at the limits of electronic constraints of circuits and consequently are very sensitive to environmental variations. In particular, changes to temperatures, power supply voltages or electromagnetic interference can affect their performance by reducing their robustness and increasing their volatility (i.e. their intra-circuit variability). Thus, for a constant challenge, the PUF can return very different results depending on environmental conditions implying the fact that a legitimate circuit could possibly be declared as being counterfeit.

Another problem relates to ageing of the integrated circuit. Due to operation at the limits of electronic constraints, the smallest defect that occurs during ageing of the circuit makes the PUF respond differently and consequently makes it impossible to identify the integrated circuit.

To overcome these defects, a received response post-processing circuit often has to be attached to the PUF, and this is expensive in terms of footprint and consumption.

The purpose of this invention is to disclose a method of securing an integrated circuit correcting the above-mentioned disadvantages, in particular by making a PUF that is almost insensitive to variations in environmental conditions without the addition of an expensive post-processing circuit and without making any significant modifications to the method of fabricating the circuit.

PRESENTATION OF THE INVENTION

This purpose is achieved with a method of securing an integrated circuit during its fabrication, said method including the following steps:
  delimitation of said integrated circuit into a first zone called a standard zone (corresponding to the integrated circuit function) and a second zone called a security zone (that will secure the integrated circuit), and
  random degradation of an interconnection structure of said security zone thus forming a physical unclonable function modelled by random electrical continuity that can be queried by a challenge-response authentication protocol.

This can identify and secure the integrated circuit in a robust manner remaining insensitive to variations in environmental conditions. Unlike prior art, this method does not use uncontrolled methods in the electrical operation of the circuit, but rather in the fabrication method itself.

Advantageously, random degradation of the interconnection structure of said security zone is made by the introduction of a contaminating element configured to make a random deterioration of part of the interconnections.

Thus, the method uses uncontrolled means in the hardware fabrication of the interconnection structure.

Advantageously, the random interconnection structure is formed between at least two corresponding layers of conducting patterns, part of the conducting patterns being configured to receive a challenge while another part of the conducting patterns is configured to provide the response to said challenge. The response is thus dependent on the electrical continuity of said random interconnection structure specific to the electrical chip and the challenge. This makes a very secure authentication possible that is protected against replay attacks.

According to one preferred embodiment of this invention, the security of the integrated circuit is integrated when fabricating the back-end (i.e. when making the first electrical interconnections) and comprises the following steps:

make a first level of conducting patterns on the surface of said standard and security zones, deposit a first multilayer on the surface of the first level of conducting patterns, comprising a barrier to metallic diffusion and an etching mask defining a set of interconnection holes, deposit at least one second layer of photosensitive resin on said first multi-layer, optical lithography in the security zone to isolate interconnection holes provided in this security zone, deposit contaminating particles with a predetermined size and shape on the surface of the standard and security zones, the particles partially or completely obstructing some of said interconnection holes in the security zone in a random manner, the deposit of contaminating particles avoiding copolymerisation of copolymers on the circuit thus assuring a very random nature, transfer obstructed or unobstructed interconnection holes in the etching mask, clean the surface of standard and security zones to remove the second layer of photosensitive resin and contaminating particles, deposit at least one third layer of photosensitive resin on the surface of standard and security zones, optical lithography in the standard zone to isolate interconnection holes provided in the standard zone, transfer interconnection holes in the etching mask, into the standard zone, reclean the surface of standard and security zones to remove the third layer of photosensitive resin, transfer interconnection holes in the standard and security zones into the metal diffusion barrier layer and fill with a metal, and make a second level of conducting patterns on the surface of the standard and security zones.

Thus, the random part is in the fabrication method and not in the different masks or etchings. Furthermore, all the successive steps are regulated and controlled to assure extremely low variability of key operating parameters of integrated circuits. Furthermore, since the fabrication of the random interconnection structure is uncontrolled, the cost of cloning becomes excessively high and reverse engineering by imagery or by learning is extremely difficult.

Particles are advantageously chosen in an appropriate manner relative to their size to optimise interconnection holes as randomly as possible.

Advantageously, the diameter of the particles is approximately equal to or is larger than the diameter of the interconnection holes. This minimises the number of partially obstructed holes. It will be noted that the particle size can also invariably be larger than or smaller than the interconnection holes.

Advantageously, the particles are balls made of polystyrene, polymethyl methacrylate (PMMA) or any type of "clean-room-compatible" polymer. This makes it possible to have particles with the same chemical nature as the photosensitive resin facilitating cleaning while remaining compatible with use in a clean-room.

Advantageously, the particles can be deposited by vaporisation or by using a spin coater of a liquid solution with a concentration of about 0.5% to 2% by mass and preferably 1% by mass. This makes it possible to use a sufficiently low concentration to avoid obstructing all interconnection holes while obstructing an optimum number of these holes. The value of the concentration of the particles is advantageously selected as a function of the particle size.

Advantageously, the method may comprise a thermal annealing step after the particles have been deposited. This can increase the adhesion of these particles.

Advantageously, the method may include an application of a voltage higher than the read voltage to break down fragile partial interconnections. This can eliminate fragile contacts and thus eliminate almost all variation by ageing.

Advantageously, the method includes the production of a plurality of random interconnection structures and a plurality of corresponding levels of conducting patterns. This further secures the integrated circuit using the challenge-response technique.

According to another embodiment of this invention, the integrated circuit is secured at the front-end.

The invention also relates to a secured integrated circuit that can be obtained using a method according to the invention.

BRIEF DESCRIPTION OF THE DRAWINGS

This invention will be better understood after reading the description of example embodiments given purely for information and that are in no way limitative, with reference to the appended drawings on which.

DETAILED PRESENTATION OF PARTICULAR EMBODIMENTS

The basic concept of the invention is deliberate and random degradation of a metallic interconnection level during fabrication by the controlled introduction of a contaminant.

Figure 1:
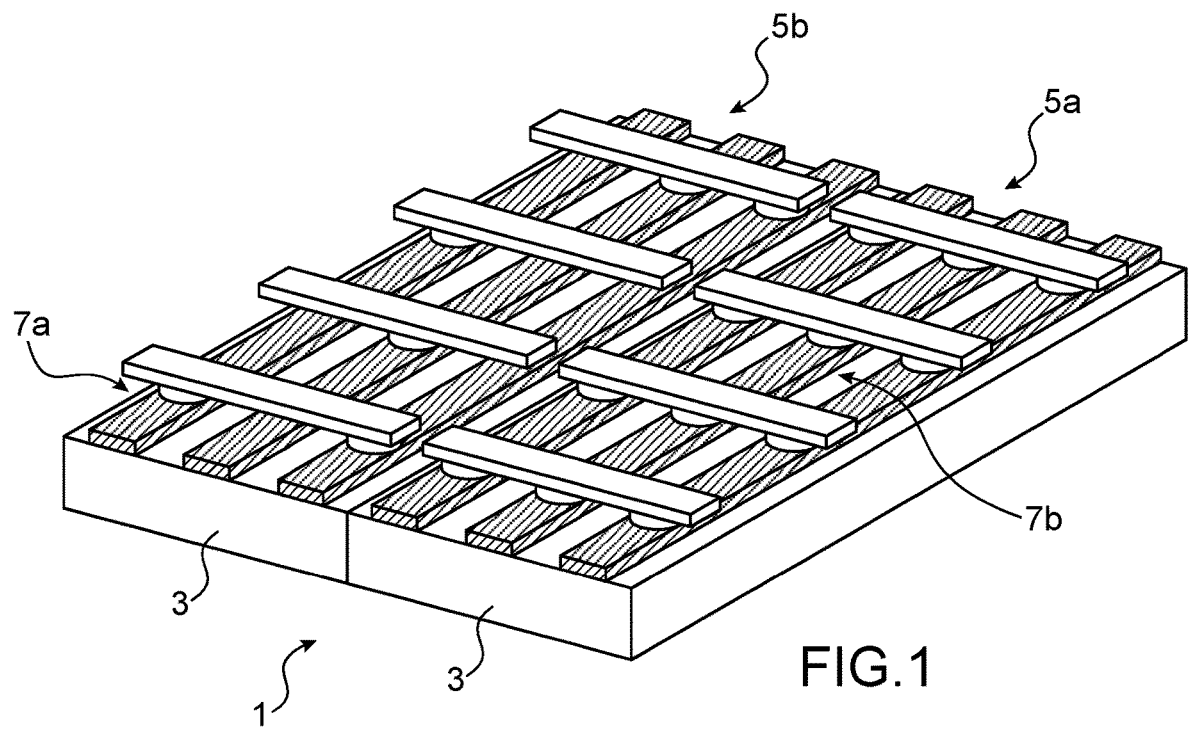
FIG. 1 very diagrammatically illustrates a method of securing an integrated circuit, according to one embodiment of the invention.

FIG. 1 very diagrammatically illustrates a method of securing an integrated circuit, according to one embodiment of the invention.

The securing method according to the invention is perfectly integrated into the actual fabrication method of the integrated circuit 1 on a silicon wafer 3. In the fabrication method, the patterns on the silicon wafer 3 are created using a photo-repetition method making each integrated circuit identical to the others. All the successive steps are regulated and controlled to assure extremely low variability of functional parameters of integrated circuits. However, the fabrication method includes intrinsically random physical implementation steps that introduce discernible characteristics that assure that each integrated circuit 1 is unique, without modifying their initial functional parameters.

During normal fabrication of the integrated circuit 1 (or electronic chip), the securing method includes delimitation of the integrated circuit 1 into a first surface zone called the standard zone 5a and a second surface zone called the security zone 5b. The standard zone 5a is the functional part of the basic integrated circuit 1. This zone Sa is occupied by basic electronic components coupled by metallic interconnections 7a adapted to perform particular functions of the circuit. On the other hand, the security zone 5b is occupied by a physical unclonable function PUF intended to secure the basic circuit. As shown in the embodiment in FIG. 1, the standard surface zone is distinct from the security surface zone. The fact that the security circuit and the functional circuit are arranged side by side makes it possible to perform steps on the two zones simultaneously, which facilitates and reduces the number of steps in the method.

More particularly, during fabrication of an interconnection structure 7b in the security zone 5b, the securing method includes random degradation of this interconnection structure 7b to form the physical unclonable function PUF. The interconnection structure 7b in the security zone 5b is modelled by a random electrical continuity that can be queried by a challenge-response authentication protocol.

Figure 2:
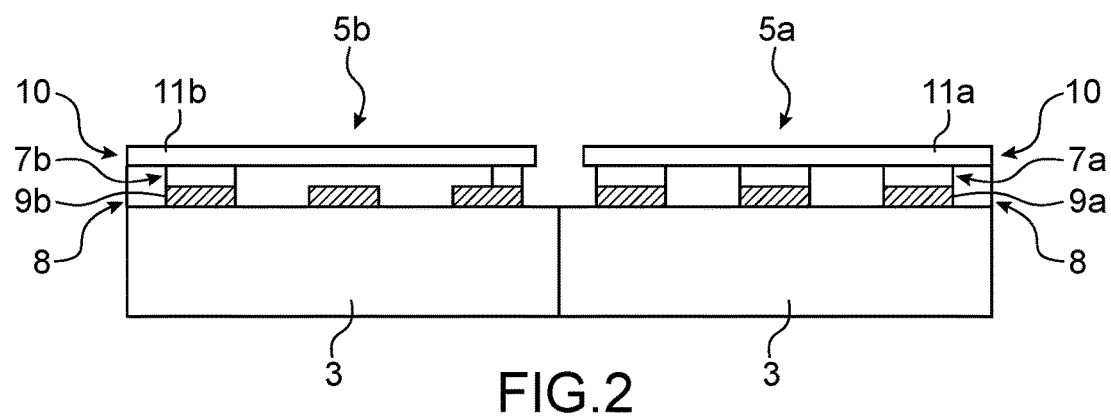
FIG. 2 very diagrammatically illustrates a sectional view of an integrated circuit made using the security method according to one embodiment of the invention.

FIG. 2 very diagrammatically illustrates a sectional view of an integrated circuit made using the security method according to one embodiment of the invention.

The secured integrated circuit (or secured electronic chip) thus comprises a standard zone 5a and a security zone 5b. The standard zone 5a normally comprises at least two levels of conducting tracks 9a and 11a connected through metallic interconnections 7a to the different electronic components (not shown) of the integrated circuit 1.

The security zone 5b comprises a random interconnection structure 7b formed between at least two levels 8 and 10 of corresponding conducting patterns 9b and 11b adapted to test the electrical continuity of this random interconnection structure 7b. It will be noted that the conducting patterns 9b and 11b can have any shape and configuration, depending on the required complexity. For example, the conducting patterns 9b and 11b can be formed by an assembly (for example several tens) of gratings or intersecting conducting tracks or any other form. Advantageously, the security zone 5b can comprise a plurality of random interconnection structures 7b (only one is shown) and a plurality of corresponding levels of conducting patterns (only two levels are shown) so that the complexity of the PUF can thus be increased.

The random interconnection structure(s) 7b model(s) electrical continuity between the different conducting patterns that can be used to apply a challenge-response authentication protocol. More particularly, one part of the conducting patterns 9b and 11b is configured to receive a stimulus defining a challenge, while another part of the conducting patterns 9b and 11b is configured to provide an output signal corresponding to the response to the challenge. The response is thus dependent on the electrical continuity of the random interconnection structure specific to the electronic chip and to the challenge used. The conducting patterns that receive the stimulus form an input to the integrated circuit, while the patterns that provide the response form the output from the integrated circuit. The conducting patterns selected to form the input or the output are predetermined according to the specifications in the authentication protocol.

The securing zone 5b of each integrated circuit 1 derived from the securing method thus has a unique physical interconnection structure 7b for which the fabrication process is random and uncontrolled and consequently extremely difficult to clone.

After the production of secure integrated circuits, an enrolment phase is performed that consists of constructing a database containing legitimate "challenge-response" pairs for each integrated circuit 1. Specifically, for each integrated circuit 1, a tester randomly generates a given number N of challenges C and addresses them to the integrated circuit 1. Each challenge C is composed of a stimulus applied to the input of the integrated circuit 1 and the response R to each challenge C is recovered at the output from the integrated circuit 1. The PUF that defines a secret function F calculates the response R to each challenge C (i.e. R=F(C)). The tester recovers the N responses R associated with the N challenges C and stores the N corresponding challenge-response (C, R) pairs in a database (not shown).

Thus, authentication of a secure integrated circuit 1 can be tested throughout its life cycle. More particularly, a user of an integrated circuit 1 can ask the manufacturer (or the entity that has the database of challenge-response pairs) for a challenge (or a challenge-response pair). The challenge C is applied to the integrated circuit 1 and this integrated circuit calculates the response R to the challenge C. The user (or the manufacturer) compares the response R generated by the integrated circuit 1 with the response stored in the database to verify the legitimacy of the integrated circuit 1. It will be noted that the challenge-response used is then deleted from the database to prevent replays, to further increase security.

FIGS. 3A-3K very diagrammatically illustrate steps in a method of securing an integrated circuit, according to one preferred embodiment of the invention.

In a manner known to the skilled person, it is considered that the integrated circuit 1 on the standard zone 5a was previously fabricated according to the usual steps of preparation of an oxide layer on a substrate, transfer of the design of the circuit to be reproduced using a mask, etching, doping, fabrication of subsequent layers, etc.

Thus, the starting point is a wafer 3 delimited into a security zone 5b and a standard zone 5a on which the entire "front-end" fabrication process was done, in other words on which practically the entire circuit to be secured was fabricated.

According to this embodiment, securing the integrated circuit 1 then begins at the end of the front-end and is integrated into the steps to fabricate semiconductor components at the "back-end", in other words when making the first electrical interconnections to interconnect components to each other appropriately and with input-output electrodes.

Figure 3A:
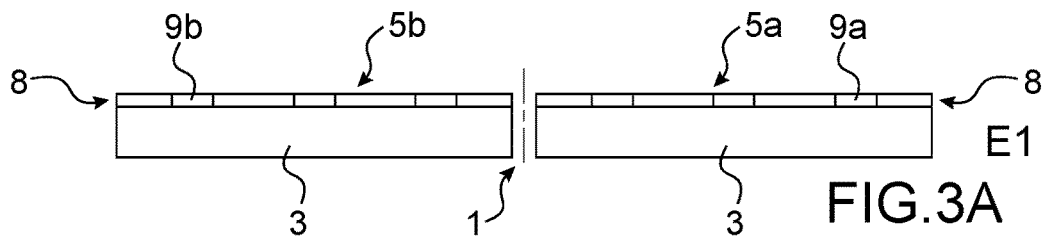
FIGS. 3A-3K very diagrammatically illustrate steps in a method of securing an integrated circuit according to one preferred embodiment of the invention.
Figure 3B:
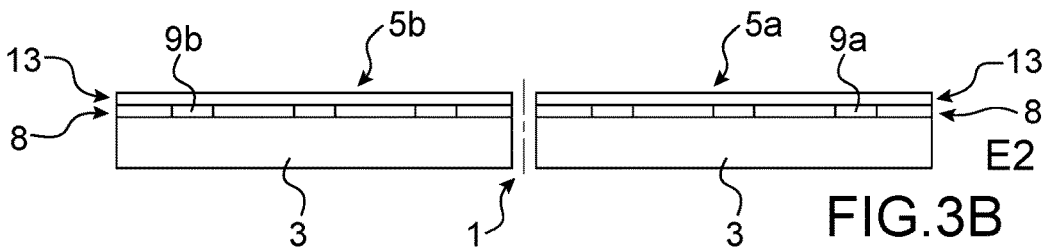
Figure 3C:
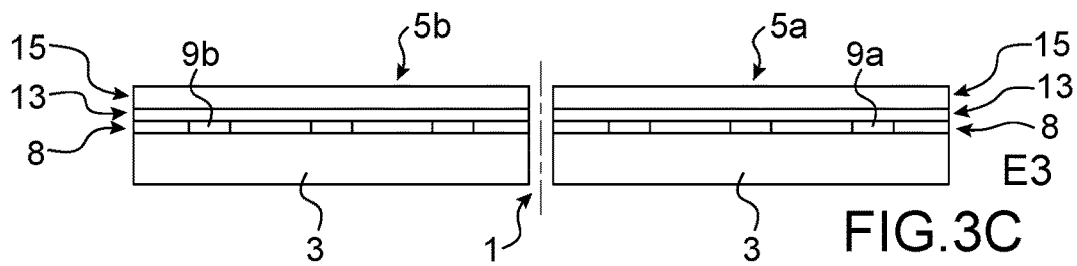
Figure 3D:
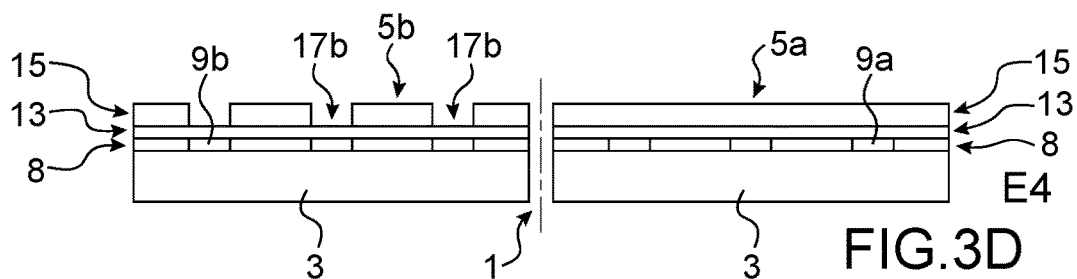
Figure 3E:
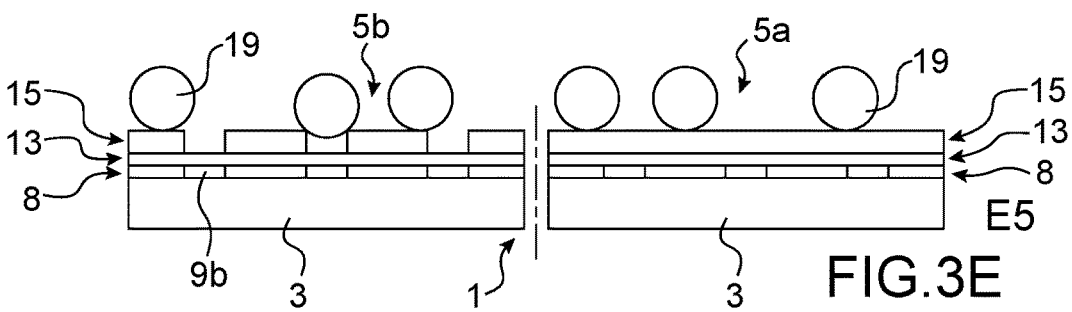
Figure 3F:
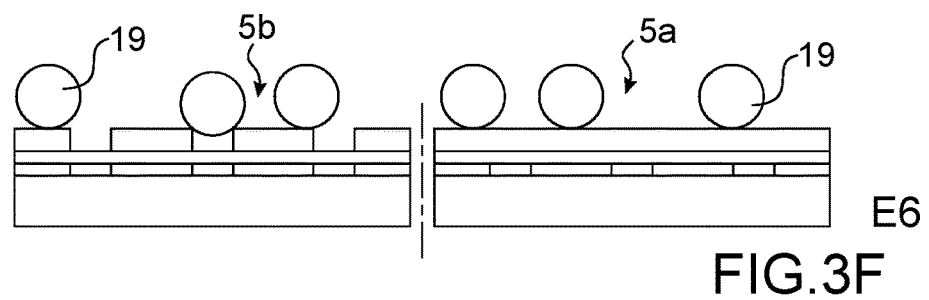
Figure 3G:
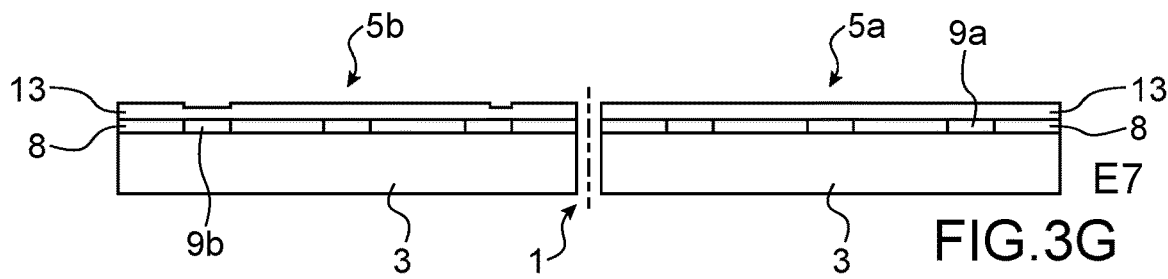
Figure 3H:
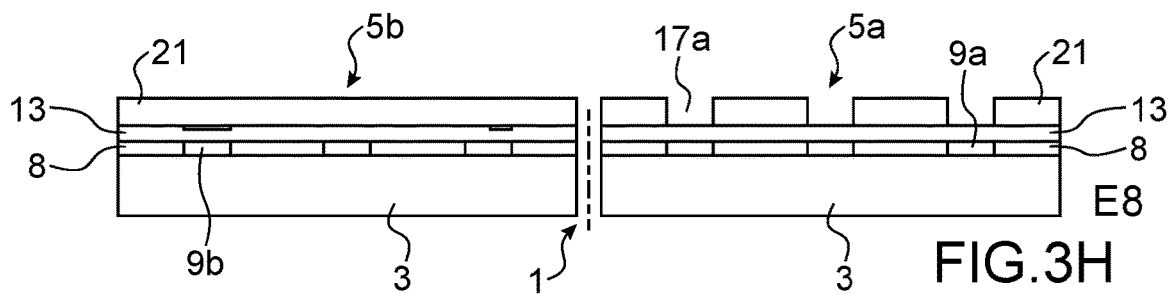
Figure 3I:
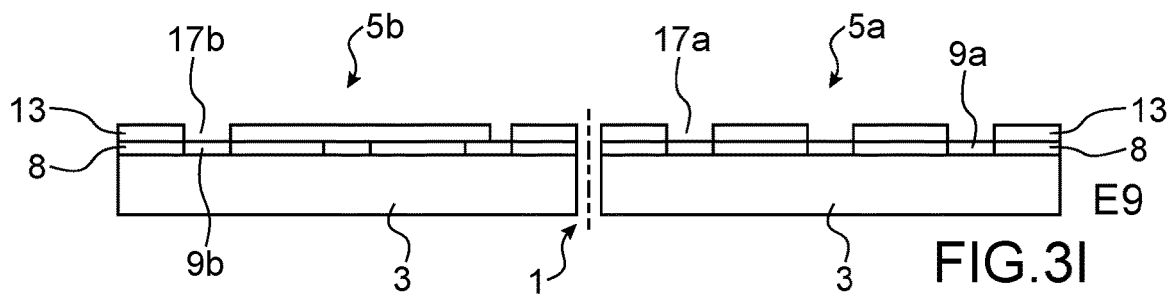
Figure 3J:
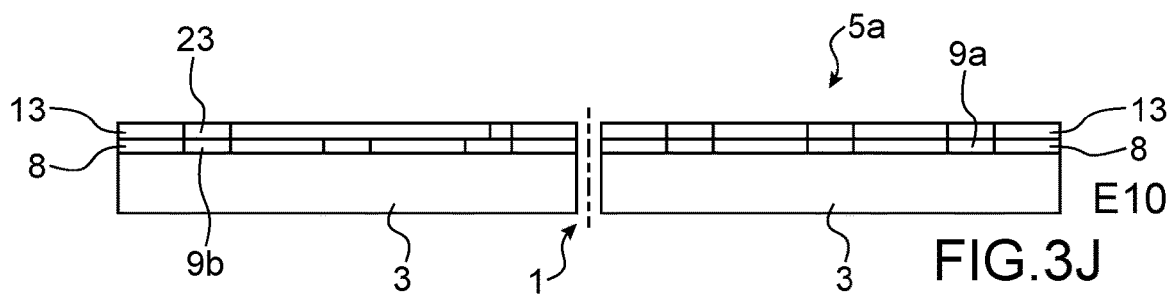
Figure 3K:
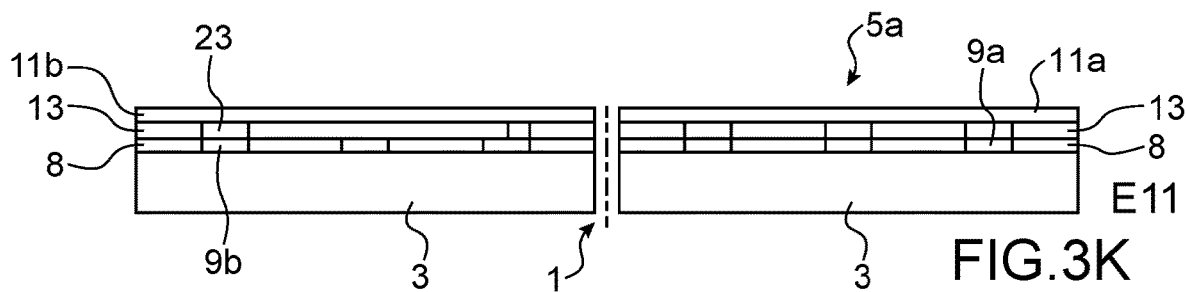

FIG. 3A very diagrammatically illustrates a first step in the securing method.

The first step E1 (FIG. 3A) consists of making a first level 8 of conducting patterns 9a and 9b on the surface of the standard zone 5a and the security zone 5b of the wafer 3. The conducting patterns 9a and 9b may be made of copper, aluminium or any other electricity conducting material. It will be noted that this step can be considered as a last step previously done at the "front-end" of the method of fabricating the integrated circuit.

The second step E2 (FIG. 3B) consists of depositing a first multi-layer 13 on the surface of the first level 8 comprising the conducting patterns 9a and 9b. The first multi-layer 13 comprises a barrier to metallic diffusion and a hard etching mask defining a set of interconnection holes called "vias" with a generally cylindrical shape. This first multi-layer 13 may for example be an SiN layer having the barrier function and an $SiO_2$ layer with the etching mask function.

The third step E3 (FIG. 3C) consists of depositing at least one layer 15 of photosensitive resin on the first multi-layer 13. In particular, a stack of layers 15 used to make the optical lithography of the next step can be deposited. This stack of layers 15 may for example be composed of two "spin on carbon" (SOC) and "Silicon Anti Reflective Coating" (SiARC) type etching mask layers and a layer of photosensitive resin. The thicknesses of these three layers can vary depending on the nature of the products used and the target via dimensions. They are typically of the order of 150 nm for SOC, of the order of 30 nm for SiARC and of the order of 100 nm for the photosensitive resin. All these layers can be deposited using the method known as "spin coating". Advantageously, the fact that the photosensitive resin is made of the same material as the contaminating particles (see step E5) assures quasi-instantaneous adhesion of the particles and prevents them from all going into via holes.

The fourth step E4 (FIG. 3D) consists of performing optical lithography in the security zone 5b to isolate the interconnection holes 17b (vias) provided in this zone 5b. It will be noted that the standard zone 5a remains protected by the second layer 15 of photosensitive resin. Thus, optical lithography is done only on the security circuit.

The fifth step E5 (FIG. 3E) consists of depositing contaminating particles 19 with a predetermined size and shape on the surface of the standard zone 5a and the security zone 5b. The size, shape and material of the particles are advantageously chosen to optimise the interconnection holes in the most random possible way. The particles 19 may be deposited by vaporisation or by spin coating of a liquid solution with a sufficiently low concentration to not obstruct all the interconnection holes 17b, while obstructing an optimum number of these holes. Thus, the density of particles 19 may be adjusted by the concentration of the liquid solution used. The value of the concentration of the particles is advantageously selected as a function of the particle size. For example, this concentration can be between 0.5% and 2% by mass and preferably of the order of 1% by mass. Thus, the particles 19 partially or completely, and randomly, obstruct some of the interconnection holes 17b of the security zone 5b.

Advantageously, the diameter of the particles 19 is approximately equal to or is larger than the diameter of the interconnection holes 17b so as to minimise the number of partially obstructed holes. This prevents particles from blocking all holes that are destined to form vias. The vaporisation or spin coating method of deposition also improves this aspect. It will be noted that the particle size can also invariably be larger than or smaller than the interconnection holes.

Furthermore, the contaminating particles 19 are advantageously balls made of any clean-room-compatible material (i.e. they are suitable for use in a clean-room) and they are preferably of the same chemical nature as the photosensitive resin. Advantageously, the particles are made from a polymer material selected for example from among the following materials: polystyrene, polymethyl methacrylate (PMMA) and polyhydroxystyrene.

Advantageously, after the deposition of particles 19, a thermal annealing step can be performed to increase adhesion of these particles.

The sixth step E6 (FIG. 3F) consists of transferring obstructed or unobstructed interconnection holes 17b in the etching mask, The random nature is thus in the fabrication method and not in the different masks or etchings.

It will be noted that this transfer step can be done partially selectively such that the smallest hole openings are not etched, thus limiting the number of partially covered vias.

The seventh step E7 (FIG. 3G) consists of cleaning the surface of the standard zone 5a and the security zone 5b to remove the second layer 15 of photosensitive resin and contaminating particles 19. If the material of the particles 19 has the same chemical nature as the resin, the two can be removed simultaneously.

The eighth step E8 (FIG. 3H) follows the normal fabrication procedure for the circuit as initially planned in the standard zone 5a. Thus, at least one third layer 21 of photosensitive resin is firstly deposited on the surface of the standard zone Sa and the security zone 5b. An optical lithography is then performed in the standard zone 5a to isolate the interconnection holes 17a (vias) planned in this zone 5a.

The ninth step E9 (FIG. 3I) consists of transferring the interconnection holes 17b from the standard zone 5A in the etching mask. The surface of the standard zone 5A and the security zone 5B is then recleaned to remove the third layer 21 of photosensitive resin.

The tenth step E10 (FIG. 3J) consists of transferring interconnection holes 17a and 17b from the standard zone 5a and from the security zone 5b into the metallic diffusion barrier layer and filling these interconnection holes 17a and 17b by a metal 23, for example made of copper or aluminium. Filling can be done selectively so as to avoid filling the smallest openings.

The eleventh step E11 (FIG. 3K) consists of making a second level of conducting patterns 11a and 11b on the surface of the standard zone 5a and the security zone 5b respectively.

This embodiment shows that all the successive steps are regulated and controlled to give an extremely low variability of key functional parameters of the circuit in the standard zone Sa while, by construction, allowing uncontrolled fabrication of the random interconnection structure 7b in the security zone 5b. This reinforces the uniqueness of each electronic chip 1, so that it can be identified very precisely, while making cloning extremely difficult.

Advantageously, in order to prevent any variation by ageing, electrical processing is done to eliminate fragile partial interconnections in the security zone 5b. More particularly, a voltage is applied exceeding the read voltage to cause failure of very fine interconnections for which the resistivity is too high. Furthermore, the authenticity of an integrated circuit 1 can be tested by presenting a challenge signal to it with a very low current that preserves the identity of the circuit throughout its life cycle.

It will be noted that the embodiment of the securing method according to FIGS. 3A-3K can be transposed to the "Front End", in other words during the fabrication of logic circuits.

The invention claimed is:
1. A method of securing an integrated circuit during its fabrication, said method comprising:
   delimitation of said integrated circuit into a first zone called a standard zone and a second zone called a security zone;
   random degradation of an interconnection structure of said security zone thus forming a physical unclonable function modelled by random electrical continuity queriable by a challenge-response authentication protocol, the random degradation of the interconnection structure of said security zone being made by introduction of a contaminating element configured to make a random deterioration of part of the interconnection structure; and
   application of a voltage higher than a read voltage to break down fragile partial interconnections.

2. The method according to claim 1, wherein the interconnection structure is formed between at least two corresponding layers of conducting patterns, part of the conducting patterns being configured to receive a challenge while another part of the conducting patterns is configured to provide a response to said challenge.

3. The method according to claim 1, wherein the security of the integrated circuit is integrated when fabricating the interconnection structure and comprises:
　making a first level of conducting patterns on a surface of said standard zone and security zone,
　depositing a first multilayer on a surface of the first level of conducting patterns, comprising a barrier to metallic diffusion and an etching mask defining a set of interconnection holes,
　depositing at least one second layer of photosensitive resin on said first multi-layer, and
　optical lithographing in the security zone to isolate the interconnection holes provided in the security zone.

4. The method according to claim 3, further comprising deposition of contaminating particles with a predetermined size and shape on the surface of the standard zone and the security zone, the contaminating particles partially or completely obstructing some of said interconnection holes in the security zone in a random manner.

5. The method according to claim 4, further comprising:
　transferring obstructed or unobstructed interconnection holes in the etching mask;
　cleaning the surface of the standard zone and the security zone to remove the second layer of photosensitive resin and the contaminating particles;
　depositing at least one third layer of photosensitive resin on the surface of the standard zone and the security zone; and
　optical lithographing in the standard zone to isolate interconnection holes provided in the standard zone.

6. The method according to claim 5, further comprising:
　transferring interconnection holes in the standard zone in the etching mask;
　recleaning the surface of the standard zone and the security zone to remove the third layer of photosensitive resin;
　transferring interconnection holes in the standard zone and the security zone into the metal diffusion barrier layer and filling with a metal; and
　making a second level of conducting patterns on the surface of the standard zone and the security zone.

7. The method according to claim 4, wherein a diameter of the contaminating particles is approximately equal to or is larger than a diameter of the interconnection holes.

8. The method according to claim 4, wherein the contaminating particles are balls made of a polymer material usable in a clean-room.

9. The method according to claim 4, wherein the contaminating particles are deposited by vaporization or by using a spin coater of a liquid solution with a concentration of about 0.5% to 2% by mass depending on a size of the contaminating particles.

10. The method according to claim 4, further comprising thermal annealing after the deposition of the contaminating particles.

11. The method according to claim 1, further comprising production of a plurality of random interconnection structures and a plurality of corresponding levels of conducting patterns.

12. The method according to claim 4, wherein the contaminating particles are balls made of polystyrene or polymethyl methacrylate.

13. A method of securing an integrated circuit during its fabrication, said method comprising:
　delimitation of said integrated circuit into a first zone called a standard zone and a second zone called a security zone;
　random degradation of an interconnection structure of said security zone thus forming a physical unclonable function modelled by random electrical continuity queriable by a challenge-response authentication protocol; and
　application of a voltage higher than a read voltage to break down fragile partial interconnections,
　wherein the integrated circuit is secured during fabrication of logic circuits.

14. An integrated circuit comprising:
　a first zone called a standard zone; and
　a second zone called a security zone, the integrated circuit being made by delimitation of the integrated circuit into the first zone called the standard zone and the second zone called the security zone, random degradation of an interconnection structure of the security zone thus forming a physical unclonable function modelled by random electrical continuity queriable by a challenge-response authentication protocol, the random degradation of the interconnection structure of the security zone being made by introduction of a contaminating element configured to make a random deterioration of part of the interconnection structure, and application of a voltage higher than a read voltage to break down a fragile partial interconnections.

* * * * *